(12) United States Patent  
Van Der Kool et al.

(10) Patent No.: US 9,242,194 B2
(45) Date of Patent: Jan. 26, 2016

(54) DEVICE FOR PURIFYING A FLUID (75) Inventors: Johannes Tseard Van Der Kool, Eindhoven (NL); Fokke Roelof Voorhorst, Eindhoven (NL); Bastian Cornelis Kleine-Doepke, Eindhoven (NL); Maiza Georgien Salomons, Eindhoven (NL); Richard Henrik Jousma, Eindhoven (NL); Eva Mondt, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 308 days.

(21) Appl. No.: 13/698,156

(22) PCT Filed: Jun. 16, 2011

(86) PCT No.: PCT/IB2011/052622
§ 371 (c)(1),
(2), (4) Date: Nov. 15, 2012

(87) PCT Pub. No.: WO2011/161591
PCT Pub. Date: Dec. 29, 2011

(65) Prior Publication Data
US 2013/0081224 A1 Apr. 4, 2013

(30) Foreign Application Priority Data
Jun. 22, 2010 (EP) ..................................... 10166862

(51) Int. Cl.
*B01D 45/08* (2006.01)
*B01D 29/90* (2006.01)
(Continued)

(52) U.S. Cl.
CPC ............... *B01D 29/90* (2013.01); *A47L 9/1683* (2013.01); *A47L 9/20* (2013.01); *B01D 29/01* (2013.01); *B01D 45/08* (2013.01); *B01D 46/0041* (2013.01); *B01D 46/10* (2013.01);
(Continued)

(58) Field of Classification Search
CPC .... B01D 45/08; B01D 46/10; B01D 46/0057; B01D 29/01; B01D 29/62
USPC ................................... 55/337, 434, 462, 465
See application file for complete search history.

(56) References Cited

U.S. PATENT DOCUMENTS 4,289,509 A 9/1981 Holter
4,938,787 A 7/1990 Simmerlein-Erlbacher
(Continued)

FOREIGN PATENT DOCUMENTS

CN 1268386 A 10/2000
DE 2651892 A1 5/1978
(Continued)

Primary Examiner — Robert A Hopkins (57) ABSTRACT

A device (1) comprises filtering means (30) for removing particles from a fluid, which have a particle collecting face (31) for collecting particles during use of the device (1), and a chamber (10) in which a fluid is present and in which the filtering means (30) are arranged. An inlet (11) of the chamber (10) comprises a spouting part (20) which serves for spouting the fluid to be filtered in a direction towards the particle collecting face (31) of the filtering means (30). An arrangement of the spouting part (20) and the particle collecting face (31) with respect to each other is adapted to generate, during operation of the device (1), a rotating flow pattern in the fluid that is present in the chamber (10) under the influence of the flow of the fluid to be filtered, whereby particles can be blown away from the particle collecting face (31).

12 Claims, 5 Drawing Sheets (51) Int. Cl.
  *B01D 29/01* (2006.01)
  *B01D 46/10* (2006.01)
  *A47L 9/20* (2006.01)
  *A47L 9/16* (2006.01)
  *B01D 46/00* (2006.01)
  *B01D 29/62* (2006.01)

(52) U.S. Cl.
  CPC ............ *B01D 29/62* (2013.01); *B01D 46/0057* (2013.01); *B01D 2277/20* (2013.01)

(56) References Cited

U.S. PATENT DOCUMENTS

| | | | |
|---|---|---|---|
| 5,595,655 A | 1/1997 | Steiner et al. | |
| 5,711,776 A | * 1/1998 | Karlsen et al. | 55/325 |
| 5,958,093 A | 9/1999 | Nani et al. | |
| 6,080,228 A | 6/2000 | Okada et al. | |
| 2005/0120510 A1 | 6/2005 | Weber | |

FOREIGN PATENT DOCUMENTS

| | | | |
|---|---|---|---|
| EP | 0269864 | A1 | 6/1988 |
| EP | 1776912 | A2 | 4/2007 |
| JP | 492542 | B1 | 1/1974 |
| JP | 5496262 | A | 7/1979 |
| JP | 61205446 | U | 12/1986 |
| JP | 07265055 | A | 10/1995 |
| JP | 08182908 | A | 7/1996 |
| JP | 09164099 | A | 6/1997 |
| JP | 2007136377 | | 6/2007 |
| JP | 2009233054 | A | 10/2009 |
| NZ | 528632 | A | 2/2005 |
| WO | 0020094 | A1 | 4/2000 |

* cited by examiner

DEVICE FOR PURIFYING A FLUID

FIELD OF THE INVENTION

The present invention relates to a device for purifying a fluid, comprising filtering means for removing particles from the fluid on the basis of a filtering action, which have a particle collecting face for collecting particles during use of the device.

BACKGROUND OF THE INVENTION

A well-known example of an application of a device for purifying a fluid as mentioned is an application in a vacuum cleaner, in which case the fluid to be filtered is air. Currently, two types of vacuum cleaners are known in the art and sold to consumers. A first type of vacuum cleaners is provided with a dust bag, whereas a second type of vacuum cleaners is not, and makes use of cyclones to separate dust and dirt particles from air.

In a vacuum cleaner comprising a dust bag, two filters are used, namely the dust bag for a majority of the dust and dirt particles, and a filter such as a so-called HEPA filter (High Efficiency Particulate Air filter) for very small particles.

A cyclonic vacuum cleaner comprises four components for filtering particles from air taken in by the vacuum cleaner during operation, namely a cyclonic pre-separator, a pre-separating grid, a cyclonic fine dust separator, and a HEPA filter. The application of a number of components is necessary in view of the fact that cyclones can filter particles with a sufficiently high mass density in a limited range of diameters. In order to be able to filter a wider range of particles, the dedicated separators as mentioned are needed, wherein the cyclonic pre-separator serves for separating relatively big particles with a high mass density from the air;
the pre-separating grid serves for filtering relatively big particles with a low mass density from the air;
the cyclonic fine dust separator serves for separating relatively small particles from the air; and
the HEPA filter serves for separating even smaller particles from the air than the cyclonic fine dust separator.

The pre-separating grid is used in view of the fact that the cyclonic pre-separator is not capable of separating particles with a low mass density like fibers, plastic foam and confetti from the air. However, the application of a grid has a disadvantage, which resides in the fact that a grid will clog. Hence, air flow resistance will increase during usage, and a constant suction power cannot be guaranteed.

Because of the need of fast rotating air on the hand and slow moving air for disposing particles on the other hand, cyclones are space-consuming solutions for separating dust and dirt particles from quantities of air. In a pre-separating unit comprising the cyclonic pre-separator and the pre-separating grid, it is the cyclonic pre-separator that needs a rather large volume compared to the pre-separating grid.

SUMMARY OF THE INVENTION

It is an object of the present invention to realize a more compact design of a pre-separating unit of a vacuum cleaner, and to provide a solution to the problem of the clogging pre-separating grid. In general terms, it is an object of the present invention to provide a device for purifying a fluid, in which filtering means having a compact design are arranged, and in which the filtering means are prevented from clogging.

According to the present invention, the object as mentioned is achieved on the basis of a device for purifying a fluid, which comprises filtering means for removing particles from the fluid on the basis of a filtering action, which have a particle collecting face for collecting particles during use of the device, and a chamber in which a fluid is present and in which the filtering means are arranged, wherein the chamber has an inlet for letting in fluid to be filtered, and an outlet for letting out filtered fluid, wherein the inlet of the chamber comprises a spouting part which serves for spouting the fluid to be filtered in a direction towards the particle collecting face of the filtering means, wherein an arrangement of the spouting part and the particle collecting face of the filtering means with respect to each other is adapted to generate, during operation of the device, a rotating flow pattern in the fluid that is present in the chamber under the influence of the flow of the fluid to be filtered, wherein the rotating flow pattern is confined by at least a portion of the particle collecting face of the filtering means for creating a shear force between the fluid in motion and the particle collecting face, wherein a distance between an outlet side of the spouting part and the particle collecting face of the filtering means, measured at a central longitudinal axis of the spouting part, is in a range of 0.5 to 7 times an inner diameter of the spouting part, and wherein a cross-sectional area of at least a portion of the chamber between the outlet side of the spouting part and the particle collecting face of the filtering means is at least 3 times as large as a cross-sectional area of the spouting part, in a direction perpendicular to the longitudinal axis of the spouting part.

The present invention is based on insights regarding the behavior of fluid flows at a spouting part or nozzle, and realizes an automatic cleaning function of the filtering means, as will be explained in the following.

In the device according to the present invention, the filtering means are arranged in a chamber in which a fluid is present. In a practical embodiment of the device, the arrangement of the filtering means in the chamber can be realized in any suitable way, wherein it is noted, that one possible way involves an arrangement of the filtering means in a wall of the chamber. The inlet of the chamber comprises a spouting part which projects into the chamber and which serves for spouting the fluid to be filtered in a direction towards the particle collecting face of the filtering means. At an outlet side of the spouting part, the fluid to be filtered flows in the surrounding fluid that is present inside the chamber, at a certain velocity, which is higher than the velocity of the surrounding fluid. As a result, the out-flowing fluid is slowed down, and the surrounding fluid is made to move. In fact, the out-flowing fluid takes surrounding fluid along, in the direction towards the particle collecting face of the filtering means. In the following, for sake of clarity, the flow of fluid to be filtered, which is supplied by the spouting part, is denoted as primary flow, and the flow of fluid that is taken along with the primary flow is denoted as secondary flow.

When the combination of the primary flow and the secondary flow arrives at the particle collecting face of the filtering means, at least a substantial portion of the primary flow passes the filtering means, while dust and dirt particles carried along with the primary flow stay behind on the particle collecting face, wherein it is possible that components of the secondary flow, such as water droplets, pass the filtering means as well. Finally, there is a flow that exits the chamber through the outlet, wherein the quantity of fluid exiting the chamber corresponds to the quantity of fluid entering the chamber. The secondary flow, however, is directed along the particle collecting face of the filtering means, wherein a natural rotation is obtained in the flow. At the particle collecting face of the filtering means, a shear force between the fluid in motion and the particle collecting face is created, which may be larger than a friction force between the particle collecting face and particles pressed against the particle collecting face under the influence of the primary flow. As a consequence, the particles are taken along with the secondary flow, so that the particle collecting face is freed from the particles, and is constantly cleaned. By means of the secondary flow, the particles are directed towards a suitable position for collecting the particles, which may be a compartment of the chamber, or another, separate chamber, for example, as will be explained later.

In order to have an effective secondary flow, it is proposed for a distance between the outlet side of the spouting part and the particle collecting face of the filtering means, measured at a central longitudinal axis of the spouting part, to be in a certain range. In particular, as mentioned in the foregoing, it is advantageous for the distance to be in a range of 0.5 to 7 times an inner diameter of the spouting part. When the distance would be smaller, a situation in which only a secondary flow with small dimensions is created would be obtained, as a result of which only a small part of the particle collecting face of the filtering means would be kept clean. In the case of a small distance, it may even be so that a secondary flow is not obtained, as there is hardly any opportunity for fluid components already present in the chamber to be taken along with the primary flow. When the distance would be larger, a situation in which the velocity of the flow along the particle collecting face is too low for realizing a cleaning effect would be obtained, as a result of which the particle collecting face would not be cleaned at all.

Preferably, the distance between the outlet side of the spouting part and the particle collecting face of the filtering means, measured at the central longitudinal axis of the spouting part, is in a range of 1 to 5 times the inner diameter of the spouting part. Even more preferably, the distance between the outlet side of the spouting part and the particle collecting face of the filtering means, measured at the central longitudinal axis of the spouting part, is in a range of 1.5 to 3 times the inner diameter of the spouting part.

It is possible to obtain the secondary flow on the basis of the primary flow when the chamber or a delimited portion of the chamber into which the spouting part discharges itself is sufficiently large, such that a flow of fluid passing through the chamber from the outlet side of the spouting part towards the particle collecting face of the filtering means is actually capable of taking along fluid components already present in the chamber. According to the present invention, the sufficient quantity of fluid is guaranteed when a cross-sectional area of at least a portion of the chamber between the outlet side of the spouting part and the particle collecting face of the filtering means is at least 3 times as large as a cross-sectional area of the spouting part, wherein both cross-sectional areas are defined as areas extending perpendicular to the longitudinal axis of the spouting part. Preferably, the cross-sectional area of at least a portion of the chamber as mentioned is at least 4 times as large as the cross-sectional area of the spouting part.

For sake of completeness, it is noted that the cross-sectional area of the spouting part is found by calculating the outcome of $\pi*(0.5*\text{inner diameter of the spouting part})^2$ when the cross-sectional area has a circular shape. The cross-sectional area of the chamber at a certain position between the outlet side of the spouting part and the particle collecting surface of the filtering means is then found by calculating the difference between the outcome of $\pi*(0.5*\text{inner diameter of the chamber at that certain position})^2$ and the cross-sectional area of the spouting part when the cross-sectional area of the chamber has a circular shape.

All in all, the fact that a cross-sectional area of at least a portion of the chamber between the outlet side of the spouting part and the particle collecting face of the filtering means is chosen such as to be at least 3 times as large as a cross-sectional area of the spouting part is a factor in actually obtaining a secondary flow, as on the basis of this fact, it is ensured that there are enough fluid components which can be taken along by the primary flow and be put in rotating motion.

It is noted that an example of a known device in which a distance between an outlet side of a spouting part and a filter, measured at a central longitudinal axis of the spouting part, is in a range of 1 to 5 times the inner diameter of the spouting part is found in DE 26 51 892, However, a portion of the chamber of the known device along the distance as mentioned is far too small for obtaining a secondary flow on the basis of a primary flow, wherein the cross-sectional area of the portion of the chamber is considerably less than 3 times as large as the cross-sectional area of the spouting part. Moreover, the filter which is part of the known device is provided with a suitable agent for binding dust particles, wherein means are provided for spraying the agent onto the filter. The filter is made of a flexible material, so that cleaning of the filter can take place by flexing the filter from time to time, whereby it is achieved that the particles which are stuck to the filter fly away from the filter and fall down to a screw mechanism for further discharging the particles.

When the present invention is applied in the context of a cyclonic vacuum cleaner without a dust bag, the cyclonic pre-separator may be omitted, and only a grid may be used for performing a pre-separating function. In this way, space may be saved. Furthermore, because of the self-cleaning feature as explained in the foregoing, the air flow resistance of the grid remains constant.

Advantageously, the longitudinal axis of the spouting part of the inlet of the chamber is at an angle with the particle collecting face of the filtering means, which deviates from 90°, as such an arrangement contributes to the creation of a rotating flow pattern in the chamber. The particle collecting face may more or less be orientated as a tangent of the circular shape of the flow movement, as it were. Preferably, the angle as mentioned is larger than 20° and smaller than 90°.

The particle collecting face of the filtering means may be inclined backwards with respect to the vertical in a normal operational position of the device, as seen from a side of the spouting part. With such an orientation of the particle collecting face, it is possible to have a situation in which dust and dirt particles which are released from the particle collecting face do not encounter the particle collecting face at a new position while moving away from the particle collecting face, so that the removal of particles from the particle collecting face can be most effective. In this respect, it is noted that the particle collecting face will normally have a planar appearance.

An additional option for cleaning the filtering means is letting the filtering means vibrate during operation of the device, like a flag or sail in the wind. It is also possible to realize mechanical vibration of the filtering means, wherein the device comprises means for imposing a vibration to the filtering means by pushing against the filtering means. Under the influence of the vibrations, dust and dirt particles adhering to the particle collecting face of the filtering means are made to detach from the particle collecting face. It is noted that vibrating a filter unit of a vacuum cleaner for the purpose of detaching dust adhering to the filter unit is known per se, for example, from EP 1 776 912.

For further confining the rotating flow pattern that is generated, during operation of the device, in the fluid that is present inside the chamber, the device may comprise at least one additional component having a face that is suitable for directing the flow. Preferably, the face of such additional component extends at a distance from the particle collecting face of the filtering means, and may furthermore extend substantially parallel to the particle collecting face. According to another option, the additional component comprises two sheets positioned in a triangular arrangement with the filtering means, wherein an opening is present between one of the sheets and the particle collecting face of the filtering means, for allowing discharge of fluid and particles from a space defined by the component and the filtering means.

The filtering means may comprise a grid, and it appears that there is an optimum to an angle at which the fluid to be filtered hits the grid, and that this optimum is related to the size of openings of the grid. With the angle at the optimum value, the self-cleaning action on the grid is optimal. For example, when the grid comprises square openings of substantially 0.25 mm×0.25 mm, an optimal angle between the longitudinal axis of the spouting part of the inlet of the chamber and the particle collecting face of the filtering means is substantially 30°. It is noted that the openings of the grid may have any suitable size and any suitable shape, and do not necessarily need to be square openings. The openings can also be circular, or have a rectangular or even triangular shape, for example. In any case, a practical value of a size of a hydraulic diameter of the grid is 0.25 mm.

For the purpose of receiving particles from the rotating flow pattern that is generated, during operating of the device, in the fluid that is present inside the chamber, and collecting the particles, there may be a second chamber in the device, wherein the first chamber and the second chamber are separate chambers which are in communication with each other through at least two passages, and wherein one of the passages through which the chambers are in communication with each other is positioned at a side of the first chamber where the filtering means are located. During operation of the device, under the influence of the secondary flow, particles which cannot pass the filtering means are made to move along the particle collecting face of the filtering means. At a certain moment, these particles reach the passage which is present in the vicinity of the filtering means, and are transported from the first chamber to the second chamber through that passage. In particular, the transport of the particles as mentioned takes place under the influence of a small component of the secondary flow, which operates as a resistant force, dragging the particles into the second chamber. The fact that the distance between the outlet side of the spouting part and the particle collecting face of the filtering means, measured at a central longitudinal axis of the spouting part, is chosen such as to be in a range of 0.5 to 7 times the inner diameter of the spouting part is a factor in making it actually possible to obtain a secondary flow that is strong enough and has dimensions which are large enough to enable the transport of the particles as mentioned.

In a practical embodiment of the device comprising the first chamber and the second chamber as mentioned in the foregoing, the particles are allowed to settle in the second chamber under the influence of gravity. For this reason, it is recommended to only have a calm and predictable flow of fluid in the second chamber. In view thereof, it is advantageous if the flow of fluid used for transporting the particles into the second chamber is allowed to leave the second chamber in a gentle way. This can be achieved if another of the passages through which the chambers are in communication with each other is positioned at a side of the first chamber where the inlet for letting in fluid to be filtered to that chamber is located. It is noted that in that case, it is very well possible to avoid interference of the re-entering flow of fluid with the secondary flow, so that the secondary flow can still have maximum effect in cleaning the particle collecting face of the filtering means. According to a preferred possibility, filter material is used in order to avoid that light particles are transported with the flow of fluid out of the second chamber. Furthermore, according to another preferred possibility, a distance between positions where the second chamber is open to the two passages through which the chambers are in communication with each other is as large as possible, in order to avoid hold-up of particles at the position where they enter the second chamber.

It is noted that the filtering means may comprise two layers of filter material, extending at a close distance with respect to each other. When the filtering means comprise filter material, the cleaning action of the secondary flow on the particle collecting face works well for coarse filter material. When dense filter material is used, the particles are not so easily removed from the particle collecting face, because a ratio of the force holding the particles against the face and the force removing the particles from the face is increased, which is caused by the fact that there is larger pressure drop over dense filter material. By applying two layers of filter material, wherein one layer comprises coarse filter material and another layer comprises dense filter material, wherein the layer of coarse filter material is arranged at the side of the filtering means where the secondary flow is, it is achieved that the cleaning function of the secondary flow can still be effective in view of the fact that there is a gradual pressure drop over the filtering means, while there is also an opportunity for catching the smaller particles.

The present invention has many useful applications, which include the application in the context of vacuum cleaners. Other practical examples include an application in a device for purifying water, wherein the fluid to be filtered is water, and an application in a device for filtering yeast particles from beer.

In general, the present invention is very well suitable to be applied in the context of the process industry, as an application of the present invention enables filtering processes which normally need to be performed in batches because of filter cleaning activities to be continuous.

The above-described and other aspects of the present invention will be apparent from and elucidated with reference to the following detailed description of a pre-separating unit of a vacuum cleaner, which comprises a self-cleaning grid and a chamber in which this grid is arranged, wherein an air inlet of the chamber comprises a spouting part which projects into the chamber.

BRIEF DESCRIPTION OF THE DRAWINGS

The present invention will now be explained in greater detail with reference to the figures, in which equal or similar parts are indicated by the same reference signs, and in which.

In some of the figures, air flows occurring in the pre-separating unit during operation are indicated by means of arrows.

DETAILED DESCRIPTION OF EMBODIMENTS

Figure 1:
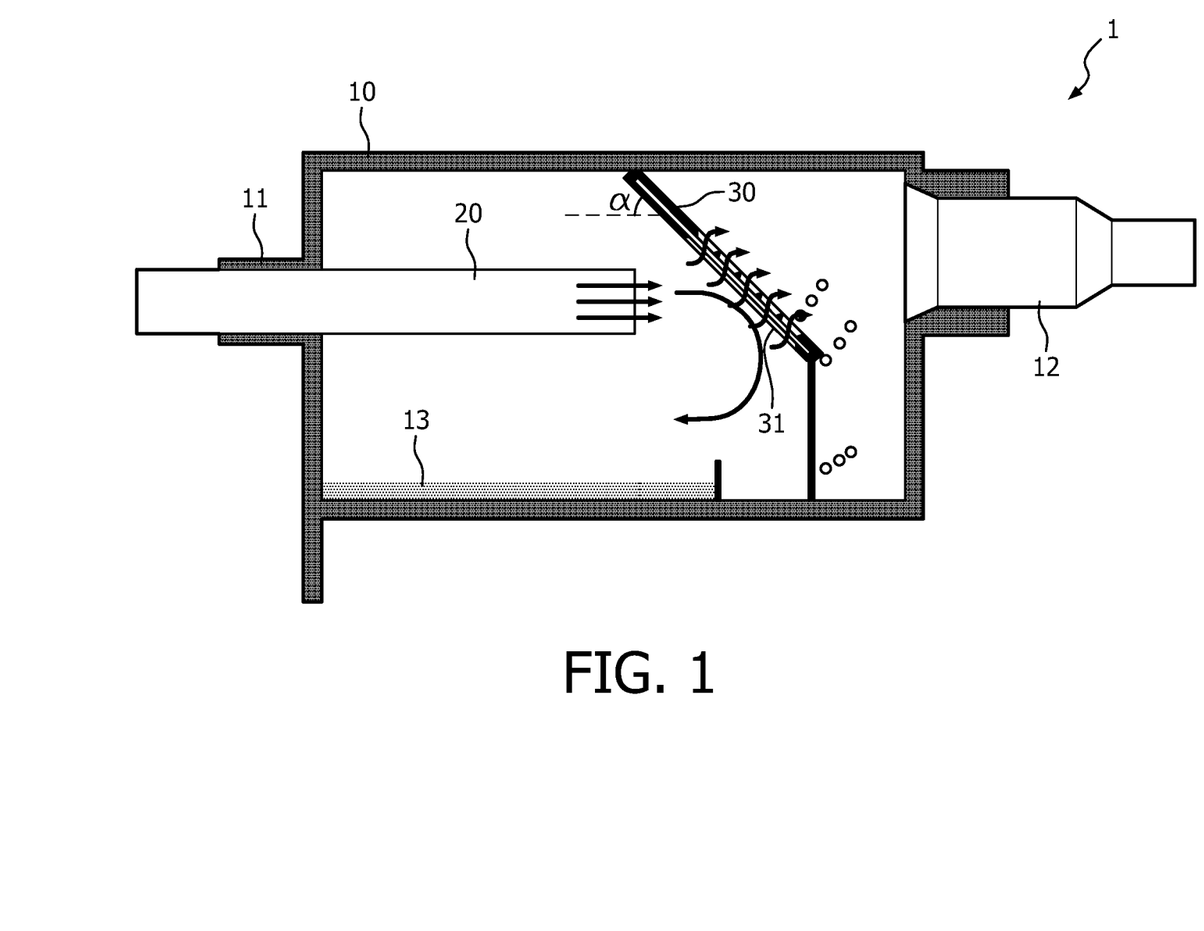
FIGS. 1 and 2 diagrammatically show a sectional view of a first embodiment of a pre-separating unit according to the present invention, for use in a vacuum cleaner.
Figure 2:
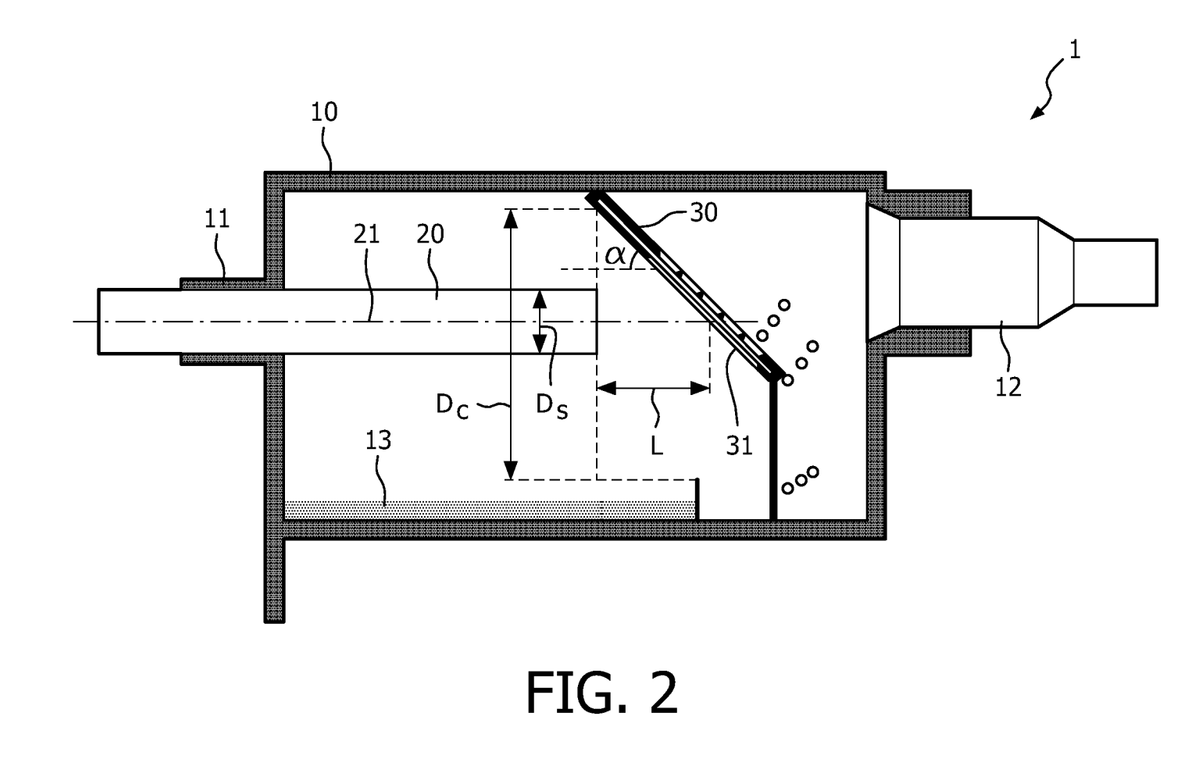

FIGS. 1 and 2 show a pre-separating unit 1, which is intended to be used in a vacuum cleaner, particularly a cyclonic vacuum cleaner without a dust bag, and which is suitable for replacing a conventional combination of a cyclonic pre-separator and a pre-separating grid. The pre-separating unit 1 as shown is an example of a device for purifying a fluid according to the present invention, which may come in other embodiments, and which may be adapted to use in other fields than vacuum cleaning, for example, in the field of purifying water or another liquid. Also, the device according to the present invention may be used instead of conventional air filters on electrical appliances.

The pre-separating unit 1 comprises a chamber 10 having an inlet 11 for letting in air contaminated with dust and dirt particles, as sucked up by the vacuum cleaner in which the unit 1 may be arranged, and an outlet 12 for letting out purified air, i.e. air that is freed of the particles. Particularly, a spouting part 20 or nozzle is arranged at the inlet 11 of the chamber 10, which serves for supplying the contaminated air to the chamber 10 at a certain velocity.

Inside the chamber 10, a grid 30 is arranged, which serves for filtering the air. It is well-known that a grid 30 has holes of a certain size, wherein the holes are large enough to allow air to pass, and wherein the holes are small enough to block the passage of particles. The grid 30 has a particle collecting face 31 for collecting the particles. In the shown example, the particle collecting face 31 extends at an angle α with respect to a longitudinal axis of the spouting part 20, i.e. a direction in which an air flow is supplied to the chamber 10, which angle α is approximately 45°. In any case, it is advantageous if the angle α is smaller than 90°. Also, it is advantageous if the angle α is larger than 20°.

When the pre-separating unit 1 is operated, contaminated air is blown into the chamber 10, at a certain velocity, through the spouting part 20. The air entering the chamber 10 applies a drag force on the air that is already present in the chamber 10. Under the influence of this force, a flow is obtained in the air, which is denoted as secondary flow, wherein the flow of air from the spouting part 20 is denoted as primary flow.

The direction of the secondary flow is influenced by the presence of the grid 30. The position and orientation of the particle collecting face 31 of the grid 30 cause the secondary flow to be a rotating flow inside the chamber 10, which passes over the particle collecting face 31, creating drag forces under the influence of which particles which are stuck on the grid 30 slide over the grid 30 and detach from the grid 30. In this way, a self-cleaning function is obtained in the chamber 10, as a result of which the grid 30 does not get clogged.

Hence, the grid 30 is placed in the primary air flow, which passes through the grid 30 while particles stay behind on the grid 30, wherein a secondary air flow is created along the grid 30 that has a function in cleaning the grid 30 by removing the particles from the grid 30. This actually happens when the force resulting from the secondary air flow, which is directed substantially parallel to the particle collecting face 31 of the grid 30, is higher than a friction force between the particles and the particle collecting face 31, which is mainly determined by a force resulting from the primary air flow.

The particles which are detached from the grid 30 are taken along by the secondary air flow, and fall down in a compartment 13 of the chamber 10 that is adapted to collect the particles.

In order to guarantee the self-cleaning function of the particle collecting face 31 of the grid 30, a distance between an outlet side of the spouting part 20 and the particle collecting face 31 of the grid 30, measured at a central longitudinal axis of the spouting part 20, is chosen such as to be 0.5 to 7 times an inner diameter of the spouting part 20. FIG. 2 is basically the same as FIG. 1, and is meant for illustrating the distance as mentioned, which is indicated in FIG. 2 by means of a letter L. The inner diameter of the spouting part 20 is indicated in FIG. 2 as well, wherein the letter $D_s$ is used. Also, the central longitudinal axis of the spouting part is illustrated, namely by means of a dash and dot line, and is indicated by reference numeral 21.

When the distance L between the outlet side of the spouting part 20 and the particle collecting face 31 of the grid 30, measured at the central longitudinal axis 21 of the spouting part 20, is in the range as mentioned, it is achieved that the secondary flow is both strong enough and large enough to cause a substantive part of the particle collecting face 31 of the grid 30 to stay clean. The velocity of the air along the particle collecting face 31 decreases when the distance L as mentioned increases, and will be too low for obtaining the desired cleaning effect at a certain maximum value of the distance L, which is a value outside of the range, and higher than the highest value of the range. On the other hand, in the case of a relatively small value of the distance L, a part of the particle collecting face 31 which comes into actual contact with the secondary flow is relatively small, and there is not so much an opportunity for the primary flow to put air components in the chamber 10 in motion in order to create the secondary flow in the first place. The part of the particle collecting face 31 which is subjected to the cleaning air flow decreases when the distance L decreases, and will be too small at a certain minimum value of the distance L, which is a value outside of the range, and lower than the lowest value of the range. Also, it may be even so that a secondary flow is not obtained when the distance L is relatively small, as the opportunity for air components in the chamber 10 to start moving along with the primary flow is limited or even practically absent.

For sake of completeness, it is noted that for the purpose of determining the range for the distance L, it is assumed that the spouting part 20 is some kind of tube, which is the case in practical situations. The tube may have a constant inner diameter over its length, but this is not necessary within the scope of the present invention. In case the tube has at least two sections with different inner diameters, the section at an outlet side of the tube can actually be regarded as constituting the spouting part 20, and hence, in such case, the inner diameter of the tube at the outlet side can be used for the purpose of determining a suitable range for the distance L, insofar as the flow of fluid as let out by the spouting part 20 can be expected to have the same diameter. In fact, the diameter of the flow of fluid is the determining factor, which can be derived from the geometry of any tube by a person skilled in the art, taking into account the fact that when a tube widens near its end, the diameter at the end is only applicable when the end portion of that tube is long enough for the flow of fluid to expand as well before leaving the tube.

It is preferred for the distance L to be in a range of 1 to 5 times the diameter $D_s$ of the spouting part 20, and it is even more preferred for the distance L to be in a range of 1.5 to 3 times the diameter $D_s$ of the spouting part 20.

For the purpose of obtaining the secondary air flow, there needs to be a sufficient quantity of air in a portion of the chamber 10 between the outlet side of the spouting part 20 and the particle collecting face 31 of the grid 30, so that enough air is available for realizing the rotating flow pattern. According to the present invention, this is the case when a cross-sectional area of at least a portion of the chamber 10 between the outlet side of the spouting part 20 and the particle collecting face 31 of the grid 30 is at least 3 times as large as a cross-sectional area of the spouting part 20, in a direction perpendicular to the longitudinal axis 21 of the spouting part 20. The cross-sectional area of the spouting part 20 is calculated on the basis of the following formula: $\pi*(0.5*D_s)^2$, assuming that the cross-sectional area has a circular shape.

Furthermore, it is possible to calculate a cross-sectional area of a portion of the chamber 10 including the cross-sectional area of the spouting part 20. In FIG. 2, a diameter of a section of the chamber 10 at the outlet side of the spouting part 20, which includes the inner diameter $D_s$ of the spouting part 20, is indicated by the letter $D_c$. The cross-sectional area of the chamber 10 including the cross-sectional area of the spouting part 20 is calculated on the basis of the following formula: $\pi*(0.5*D_c)^2$, assuming that the cross-sectional area has a circular shape. The actual cross-sectional area of the chamber 10 can then be found by calculating the difference between the outcome of this formula and the value of the cross-sectional area of the spouting part 20. It is clear that in the example shown in FIG. 2, the cross-sectional area of the chamber 10 is many times larger than the cross-sectional area of the spouting part 20, even far more than 3 or 4 times, so that there is plenty of air available inside the portion of the chamber 10 between the outlet side of the spouting part 20 and the particle collecting face 31 of the grid 30 for forming the secondary air flow.

The grid 30 can possibly be replaced by filter material. In that case, there is a risk that relatively small particles clog the filter, even though relatively large particles are blown away from the filter. Possible solutions for removing the smaller particles from the filter can be making the filter vibrate like a flag or sail in the wind, or realizing mechanical vibration of the filter. Another solution for having a useful filter will be described later with reference to FIG. 7.

Figure 3:
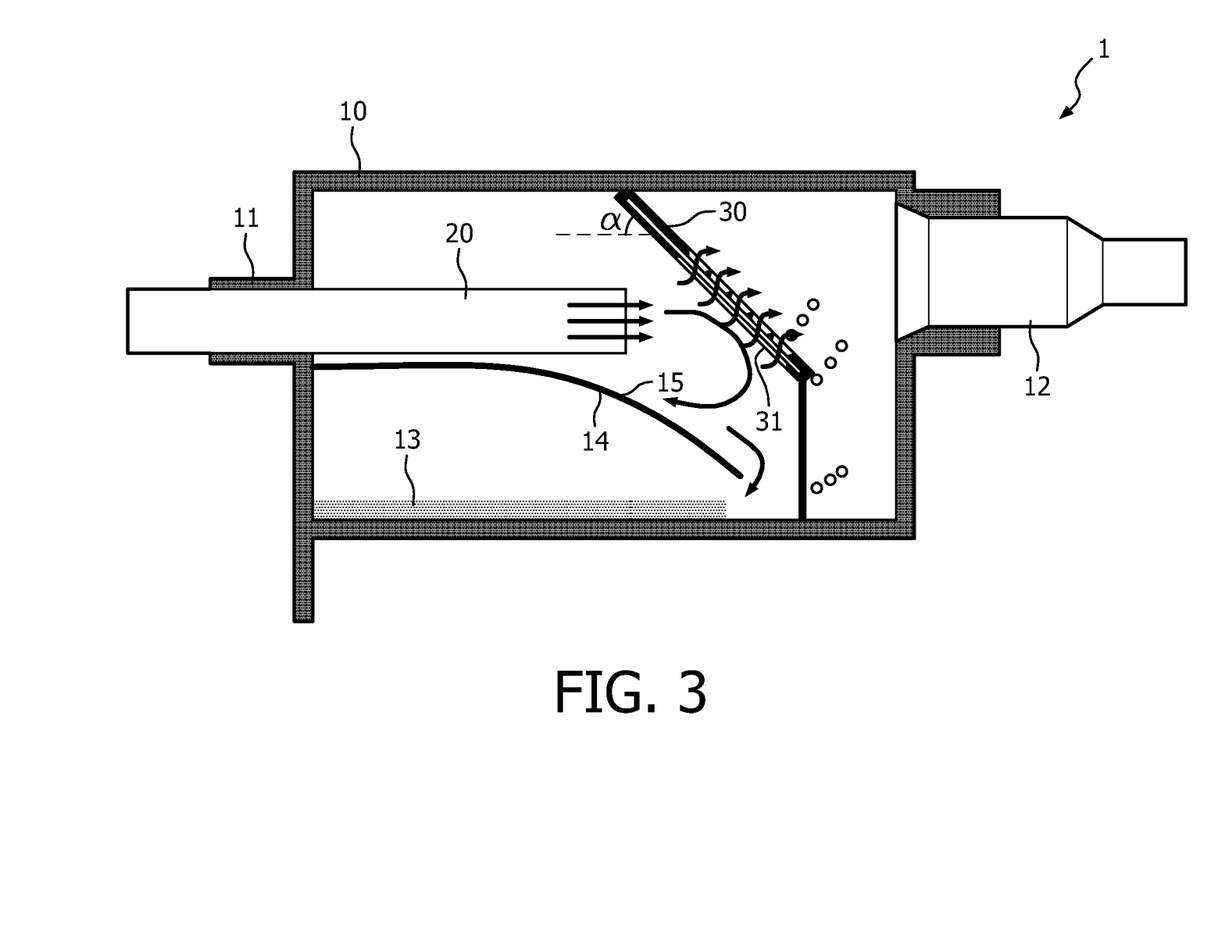
FIG. 3 illustrates the application of a first type of additional component in the pre-separating unit shown in FIGS. 1 and 2.

FIG. 3 illustrates how an additional component 14 can be used in the pre-separating unit 1 for resizing the secondary air flow, wherein the unit 1 can be smaller, and wherein the operation of the unit 1 can be more stable. The additional component 14 can comprise a plastic sheet, for example, having a face 15 that extends at a distance from the grid 30, in a more or less parallel direction. The size of the rotating secondary air flow is determined by the positioning of the face 15 of the additional component 14, as the said air flow is present between the particle collecting face 31 of the grid 30 and the said face 15.

Figure 4:
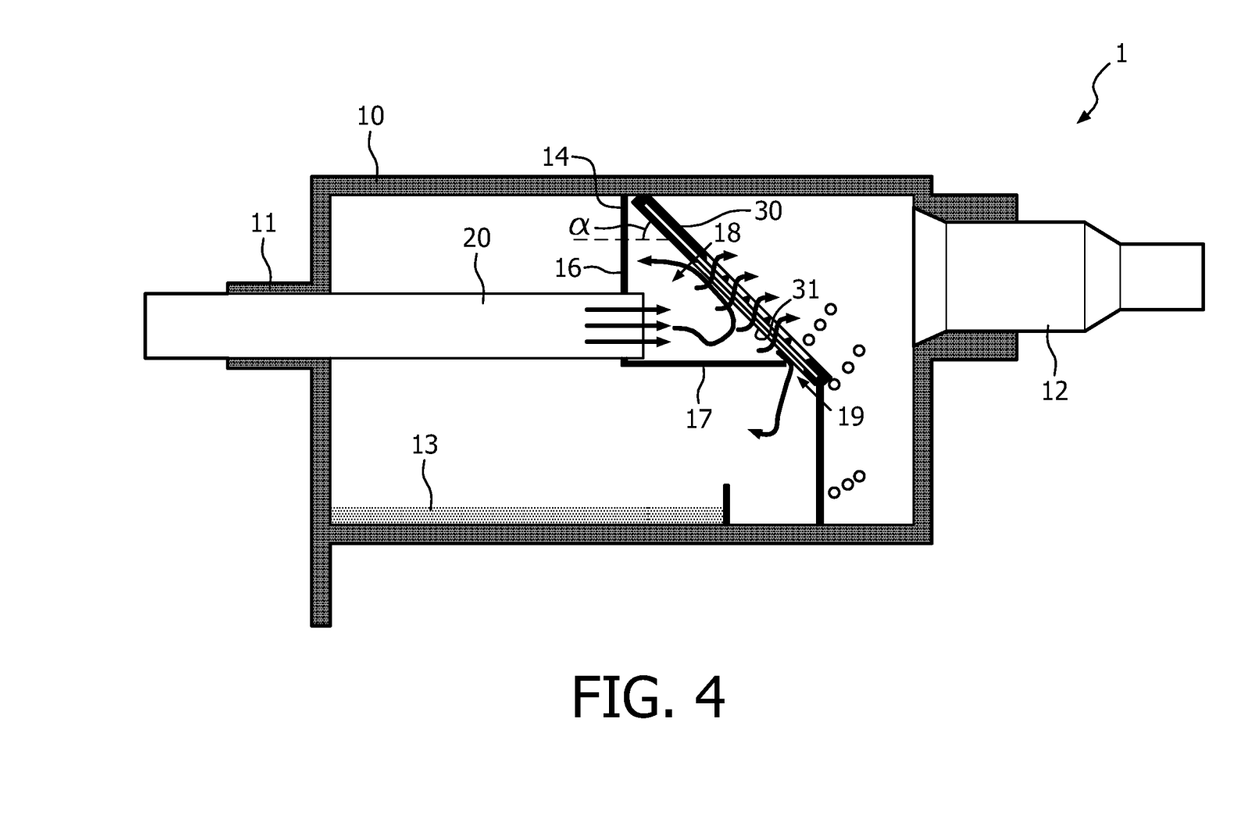
FIG. 4 illustrates the application of a second type of additional component in the pre-separating unit shown in FIGS. 1 and 2.

FIG. 4 shows another example of the use of an additional component 14 for resizing the secondary flow in the pre-separating unit 1. In this example, the additional component 14 comprises two sheets 16, 17, wherein, in the normal orientation of the unit 1 as shown in the figures, one of the sheets 16, 17 extends in a substantially horizontal direction, and another of the sheets 16, 17 extends in a substantially vertical direction, in such a way that a space 18 having a triangular circumference, as seen in a horizontal direction, perpendicular to the longitudinal axis 21 of the spouting part 20, is defined by the sheets 16, 17 as mentioned and a portion of the grid 30. An opening 19 of the space 18 is present between the more or less horizontal sheet 17 and the particle collecting face 31 of the grid 30. During operation of the device 1, particles which are removed from the particle collecting face 31 under the influence of the secondary air flow are discharged to another portion of the chamber 10, through the opening 19. Preferably, the spouting part 20 is arranged such as to supply the primary flow in a top portion or a bottom portion of the triangular space 18, wherein the best cleaning results of the particle collecting face 31 can be expected.

For sake of completeness, it is noted that the example as shown in FIG. 4 still meets the criterion of at least a portion of the chamber 10 between the outlet side of the spouting part 20 and the particle collecting face 31 of the grid 30 having a cross-sectional area which is at least 3 times as large as the cross-sectional area of the spouting part 20. The sheets 16, 17 do not delimit a width of the chamber 10, i.e. a dimension perpendicular to the depiction of the pre-separating unit 1 in FIG. 2, so that a sufficient quantity of air is available for forming the secondary air flow.

The pre-separating unit 1 can be relatively small, and may even be suitable to be arranged in a handle of vacuum cleaner. An example of small dimensions of a practical embodiment of the unit 1 is the following: a height of the chamber 10 is 40 mm, a length of the chamber 10, i.e. a dimension of the chamber 10 in the direction of the longitudinal axis 21 of the spouting part 20, is 80 mm, a width of the chamber 10 is at least 100 mm, an area of the grid 30 is at least 160 mm², a grid size is 255 μm, a size of openings in the chamber 10 is 25 mm, the angle α at which the particle collecting face 31 extends with respect to the longitudinal axis 21 of the spouting part 20 is 30°±5°, the inner diameter $D_s$ of the spouting part 20 is 27.6 mm, and an inner diameter of the outlet 12 is at least 35 mm.

Figure 5:
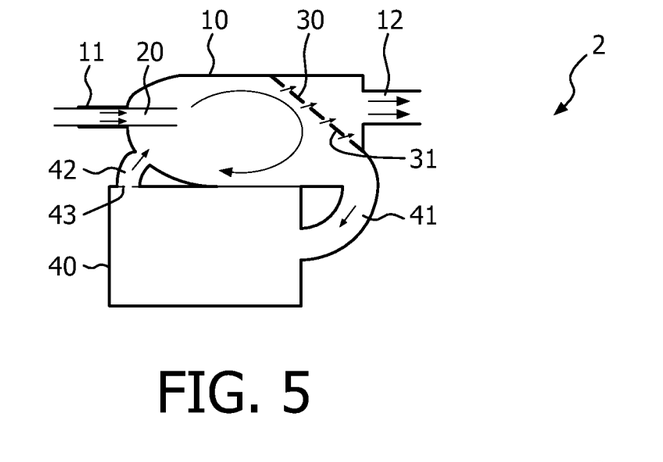
FIG. 5 diagrammatically shows a sectional view of a second embodiment of a pre-separating unit according to the present invention, for use in a vacuum cleaner.
Figure 6:
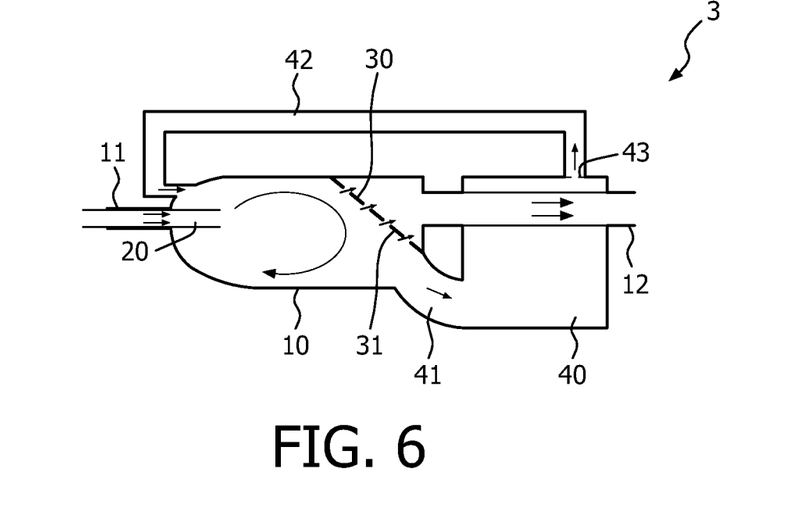
FIG. 6 diagrammatically shows a sectional view of a third embodiment of a pre-separating unit according to the present invention, for use in a vacuum cleaner.

FIGS. 5 and 6 show alternative embodiments of the pre-separating unit 1, which are indicated by means of reference numerals 2 and 3, respectively. In the pre-separating unit 1, particles which are detached from the grid 30 are taken along by the secondary air flow, and fall down in a compartment 13 of the chamber 10 that is adapted to collect the particles. However, when the amount of separated particles residing inside the compartment 13 as mentioned increases, there is a risk that some of the particles get in an area of influence of the secondary air flow and are re-entrained with the secondary air flow. Subsequently, these particles reach the grid 30 for the second time, and may clog the particle collecting face 31 of the grid 30. As the amount of separated particles increases, the probability of re-entrainment increases as well, leading to an increased hold-up of particles in the secondary air flow, and a higher probability of clogging of the grid 30, and increased pressure loss. In order to decrease the probability of the disadvantageous effects described in the foregoing, it is proposed to disconnect an area for collecting the particles from the area where the secondary air flow is. In particular, a separate chamber 40 for collecting the particles may be applied, as illustrated in FIGS. 5 and 6.

In the pre-separating units 2 and 3 shown in FIGS. 5 and 6, a secondary air flow is obtained during operation, and used for cleaning the particle collecting face 31 of the grid 30, in the same manner as already described in respect of the pre-separating unit 1 shown in FIGS. 1-4. Particles which cannot pass the grid 30 are pushed in a downward direction along the particle collecting face 31 by the rotating secondary air flow. When these particles reach an end of the particle collecting face 31, they are guided by a small component of the secondary air flow into the particle collecting chamber 40, through a passage 41 between the two chambers 10, 40. In this respect, it is noted that the fact that there are requirements in respect of the distance L between the outlet side of the spouting part 20 and the particle collecting face 31 of the grid 30, measured at the central longitudinal axis 21 of the spouting part 20, by means of which it is guaranteed that a secondary air flow is obtained that is strong enough and large enough to realize the self-cleaning function of the particle collecting face 31 of the grid 30, is a factor in realizing the transport of the particles to the particle collecting chamber 40 as well.

In the shown embodiments, the particles settle in the particle collecting chamber 40 under the influence of gravity. In the embodiment of the pre-separating unit 2 shown in FIG. 5, recirculation of air inside the particle collecting chamber 40 is avoided by having a second passage 42 between the chambers 10, 40, which is arranged close to the inlet 11 of the chamber 10 in which the grid 30 is located. Filter material 43 can be placed at an air inlet side of the second passage 42, so that transport of light particles along with the air flow out of the particle collecting chamber 40 cannot take place. Due to the fact that the air flow entering the particle collecting chamber 40 is only a small component of the secondary air flow, the air flow through the filter 43 is very low, and, as a consequence, pressure loss over the filter 43 is low, even if the filter 43 is contaminated. Preferably, a distance between positions where the particle collecting chamber 40 is open to the two passages 41, 42 is as large as possible, in order to avoid hold-up of particles at the position where the first passage 41 provides access from the chamber 10 in which the grid 30 is located to the particle collecting chamber 40. Furthermore, the second passage 42 is preferably positioned such as to avoid a situation in which the secondary air flow is influenced by the re-entering air flow. This can be realized when the re-entering air flow is allowed to enter the chamber 10 in which the grid 30 is located in a direction parallel to the air flow supplied to the chamber 10 through the main inlet 11, which is the case in the embodiment of the pre-separating unit 2 shown in FIG. 5.

If there would only be one passage between the chambers 10, 40, the air would leave the particle collecting chamber 40 through the same passage as through which it enters the particle collecting chamber 40, creating an unstable circulating air flow near the position where the air is coming in. As the passage is completely open, light particles may then be transported back to the chamber 10 in which the grid 30 is located. As a result, the load on the self-cleaning grid 30 increases and its performance may drop. Hence, although an embodiment with only one passage between the chambers 10, 40 is possible, such an embodiment is not preferred.

It is possible for particles to be directly transported to the particle collecting chamber 40, without even reaching the grid 30. This mainly occurs for relatively heavy particles, which, due to their weight, are not entrained in the secondary air flow, but are immediately transported to the lower particle collecting chamber 40.

Advantageously, the cross-sectional area of the first passage 41 is constant over its length. If the first passage 41 would diverge, air flows may be created by means of which particles may be transported back to the upper chamber 10 in which the grid 30 is located. If the first passage 41 would converge, the air is accelerated, which may lead to an incoming jet stream in the particle collecting chamber 40, causing an unwanted spread of the collected particles.

FIG. 6 also shows an embodiment of the pre-separating unit 3 in which the unit 3 comprises two separate chambers 10, 40, wherein one chamber 10 serves for accommodating the grid 30, wherein the secondary air flow is created in that chamber 10, and wherein another chamber 40 serves for collecting particles. In this way, when the two chambers 10, 40 are isolated from a fluid dynamic point of view, meaning that the secondary air flow is not allowed to contact already separated particles, re-entrainment of the already separated particles in the secondary flow is avoided, as described in the foregoing.

Like the embodiment of the pre-separating unit 2 shown in FIG. 5, the embodiment of the pre-separating unit 3 shown in FIG. 6 has two passages 41, 42 between the chambers 10, 40, wherein the passages 41, 42 have a constant cross-sectional are over their lengths. In this way, a circulating air flow inside the particle collecting chamber 40 is avoided. In the embodiment of the pre-separating unit 3 shown in FIG. 6, the particle collecting chamber 40 is located parallel to the chamber 10 where the grid 30 is located, instead of underneath this chamber 10. This embodiment and other embodiments are possible within the framework of the preferred design constraints mentioned in the foregoing.

As mentioned in the foregoing, the grid 30 can possibly be replaced by filter material. When coarse filter material is applied, the measures for realizing the self-cleaning function of the particle collecting face 31 of the filter 30 work out well. However, when dense filter material is applied, the particles are not so easily removed from the particle collecting face 31. The reason is that a ratio of the force holding the particles onto the particle collecting face 31 and the force removing the particles from the particle collecting face 31 increases in case finer filter material is applied.

The force holding the particles onto the particle collecting face 31 comprises two components. A first component is a force proportional to the square of the air velocity pressing the particles against the particle collecting face 31. A second component is a force created by the pressure drop over the filter 30. The force removing the particles from the particle collecting face 31 is proportional to the square of the velocity along the particle collecting face 31. For both a coarse filter material and a dense filter material, the ratio of the forces due to the velocity components into and along the filter material are similar, as both increase and decrease to a similar extent with the air flow. However, the force component related to the pressure drop is much larger in case of dense filter material than in case of coarse filter material. This makes it more difficult to remove particles from a dense filter than from a coarse filter.

Figure 7:
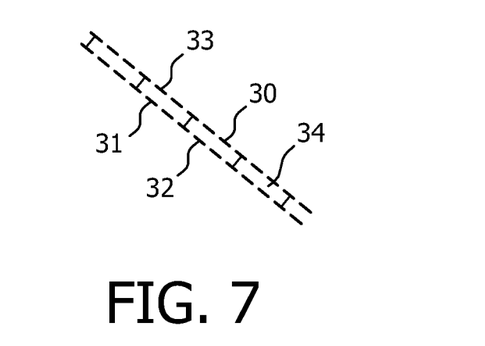
FIG. 7 illustrates a possible application in a unit according to the present invention of a filter comprising two layers of filter material.

In order to ensure a proper self-cleaning mechanism of the filter 30 when dense material is applied, it is proposed to use two filter layers 32, 33 in the filter 30, which are separated by a narrow air gap 34, such that there is no complete physical contact between the two filter layers 32, 33, as illustrated in FIG. 7. When the two filter layers 32, 33 are applied, with a coarse filter layer 32 facing the air flow and a dense filter 33 for filtering the smaller particles, both a proper filtering function and a proper self-cleaning function of the filter 30 are realized. For sake of completeness, it is noted that the particle collecting face 31 of the filter 30 is the outside face of the coarse filter layer 32.

The pressure over the filter layers 32, 33 decreases gradually from an initial pressure to an intermediate pressure to a final pressure. Particles pressed against the coarse filter layer 42 experience a force due to the difference between the initial pressure and the intermediate pressure, which is much lower than the difference between the intermediate pressure and the final pressure, due to the difference of the type of filter material. Therefore, the larger particles which are present on the particle collecting face 31 are easily displaced along the face 31 and removed from the face 31 under the influence of the secondary air flow, whereby it is achieved that the face 31 is kept clean.

It will be clear to a person skilled in the art that the scope of the present invention is not limited to the examples discussed in the foregoing, but that several amendments and modifications thereof are possible without deviating from the scope of the present invention as defined in the attached claims. While the present invention has been illustrated and described in detail in the figures and the description, such illustration and description are to be considered illustrative or exemplary only, and not restrictive. The present invention is not limited to the disclosed embodiments.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the present invention.

For sake of completeness, it is noted that within the scope of the present invention, it is possible to use means like a fan driven by a motor for generating a cleaning flow of fluid along the particle collecting face 31 of the filtering means 30, wherein such a flow of fluid is additional to the secondary flow that is generated on the basis of the primary flow without the need for any further supply of energy, as explained in the foregoing.

The present invention can be summarized as follows. A device 1, 2, 3 for purifying a fluid comprises filtering means 30 for removing particles from the fluid on the basis of a filtering action, which have a particle collecting face 31 for collecting particles during use of the device 1, 2, 3, and a chamber 10 in which a fluid is present and in which the filtering means 30 are arranged. The chamber 10 has an inlet 11 for letting in fluid to be filtered, and this inlet 11 comprises a spouting part 20 which serves for spouting the fluid to be filtered in a direction towards the particle collecting face 31 of the filtering means 30. An arrangement of the spouting part 20 and the particle collecting face 31 of the filtering means 30 with respect to each other is adapted to generate, during operation of the device 1, 2, 3, a rotating flow pattern in the fluid that is present in the chamber 10 under the influence of the flow of the fluid to be filtered, wherein the rotating flow pattern is confined by at least a portion of the particle collecting face 31 of the filtering means 30 for creating a shear force between the fluid in motion and the particle collecting face 31. Under the influence of this shear force, particles can be blown away from the particle collecting face 31, so that the filtering means 30 are kept clean. For the purpose of realizing the rotating flow pattern and an effective shear force on a considerable part of the particle collecting face 31 of the filtering means 30, a distance L between an outlet side of the spouting part 20 and the particle collecting face 31, measured at a central longitudinal axis 21 of the spouting part 20, is chosen such as to be in a range of 0.5 to 7 times an inner diameter $D_s$ of the spouting part 20, preferably in a range of 1 to 5 times the inner diameter $D_s$ of the spouting part 20, and more preferably in a range of 1.5 to 3 times the inner diameter $D_s$ of the spouting part 20. In order to have a sufficient quantity of fluid available for forming the rotating flow pattern, a cross-sectional area of at least a portion of the chamber 10 between the outlet side of the spouting part 20 and the particle collecting face 31 of the filtering means 30 is chosen such as to be at least 3 times as large as a cross-sectional area of the spouting part 20, in a direction perpendicular to the longitudinal axis 21 of the spouting part 20, preferably such as to be at least 4 times as large.

The device 1, 2, 3 according to the present invention may be used for replacing a conventional combination of a cyclonic separator and a grid, for example, a pre-separating unit of a cyclonic vacuum cleaner without a dust bag, so that space is saved. Also, in such a case, due to the self-cleaning function of the device 1, 2, 3, the air flow resistance is kept constant, and so is the suction power.

Advantageously, the particles are collected outside of the chamber 10 where the filtering means 30 are located, so that there is no risk of the particles getting re-entrained with the air flow in the chamber 10. In a practical embodiment, a separate chamber 40 is provided, wherein the chambers 10, 40 are in communication with each other through two passages. Through one passage 41, air and particles flow from the first chamber 10 into the second chamber 40, and through another passage, air flows from the second chamber 40 into the first chamber 10. The particles stay behind in the second chamber 40 and settle there, under the influence of a settling force, which may be gravity.

When it is desirable to apply dense filter material for filtering small particles, it is advantageous to apply a filter 30 having both a coarse filter layer 32 and a dense filter layer 33, separated by a narrow air gap 34, wherein the coarse filter layer 32 is arranged at the side of the secondary air flow. In that case, it is achieved that there is a graduate pressure drop over the filter 30, wherein a first pressure drop, i.e. the pressure drop over the coarse filter layer 32 is low enough for the self-cleaning function of the filter 30 to be realized in a proper way.

The invention claimed is:

1. Device for purifying a fluid, comprising:
  filtering means for removing particles from the fluid on the basis of a filtering action, which have a particle collecting face for collecting particles during use of the device, and
  a chamber in which a fluid is present and in which the filtering means are arranged, wherein the chamber has an inlet for letting in fluid to be filtered, and an outlet for letting out filtered fluid,
  wherein the inlet of the chamber comprises a spouting part which projects into the chamber and which serves for spouting the fluid to be filtered in a direction towards the particle collecting face of the filtering means,
  wherein an arrangement of the spouting part and the particle collecting face of the filtering means with respect to each other is adapted to generate, during operation of the device, a rotating flow pattern in the fluid that is present in the chamber under the influence of the flow of the fluid to be filtered, wherein the rotating flow pattern is confined by at least a portion of the particle collecting face of the filtering means for creating a shear force between the fluid in motion and the particle collecting face,
  wherein a distance (L) between an outlet side of the spouting part and the particle collecting face of the filtering means, measured at a central longitudinal axis of the spouting part, is in a range of 0.5 to 7 times an inner diameter ($D_s$) of the spouting part, and
  wherein a cross-sectional area of at least a portion of the chamber between the outlet side of the spouting part and the particle collecting face of the filtering means is at least 3 times as large as a cross-sectional area of the spouting part, in a direction perpendicular to the longitudinal axis of the spouting part.

2. Device according to claim 1, wherein a cross-sectional area of at least a portion of the chamber between the outlet side of the spouting part and the particle collecting face of the filtering means is at least 4 times as large as a cross-sectional area of the spouting part, in a direction perpendicular to the longitudinal axis of the spouting part.

3. Device according to claim 1, wherein the distance (L) between the outlet side of the spouting part and the particle collecting face of the filtering means, measured at the central longitudinal axis of the spouting part, is in a range of 1 to 5 times the inner diameter ($D_s$) of the spouting part.

4. Device according to claim 1, wherein a distance (L) between the outlet side of the spouting part and the particle collecting face of the filtering means, measured at the central longitudinal axis of the spouting part, is in a range of 1.5 to 3 times the inner diameter ($D_s$) of the spouting part.

5. Device according to claim 1, wherein the longitudinal axis of the spouting part of the inlet of the chamber is at an angle ($\alpha$) with the particle collecting face of the filtering means, which is larger than 20° and smaller than 90°.

6. Device according to claim 1, comprising at least one component having a face for further confining the rotating flow pattern that is generated, during operation of the device, in the fluid that is present inside the chamber.

7. Device according to claim 6, wherein the face of the component extends at a distance from the particle collecting face of the filtering means, substantially parallel to the particle collecting face of the filtering means.

8. Device according to claim 6, wherein the component comprises two sheets positioned in a triangular arrangement with the filtering means, wherein an opening is present between one of the sheets and the particle collecting face of the filtering means.

9. Device according to claim 1, comprising a second chamber besides the first chamber in which the filtering means are arranged, wherein the second chamber is adapted to receive particles from the rotating flow pattern that is generated, during operation of the device, in the fluid that is present inside the first chamber, and to collect the particles, wherein the first chamber and the second chamber are separate chambers which are in communication with each other through at least two passages, and wherein one of the passages through which the chambers are in communication with each other is positioned at a side of the first chamber where the filtering means are located.

10. Device according to claim 9, wherein another of the passages through which the chambers are in communication with each other is positioned at a side of the first chamber where the inlet for letting in fluid to be filtered to that chamber is located.

11. Device according to claim 1, wherein the filtering means comprise two layers of filter material, extending at a close distance with respect to each other.

12. Vacuum cleaner, comprising a device according to claim 1, wherein the fluid to be filtered is air.

* * * * *